Figure 1:
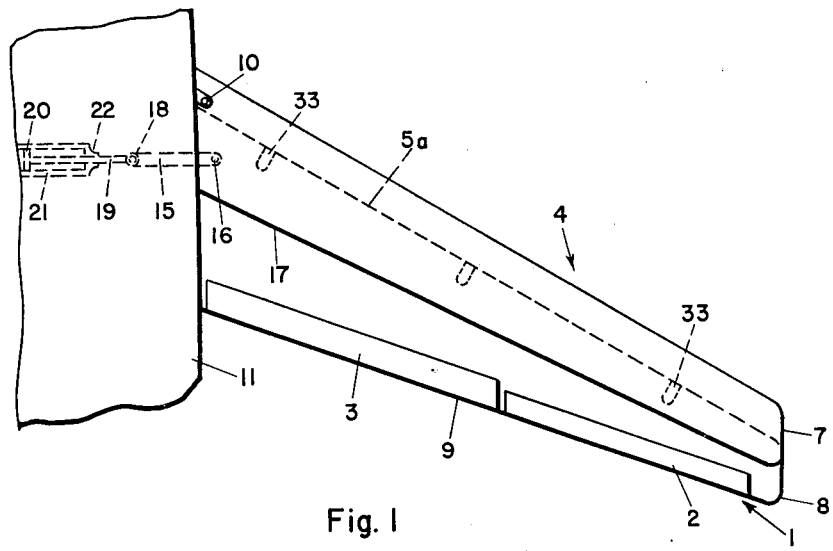

May 1, 1956  W. A. FIEDLER  2,743,887
SPLIT AIRCRAFT WING

Filed Nov. 12, 1952  3 Sheets-Sheet 1

INVENTOR.
WILLY A. FIEDLER
BY
ATTORNEYS

May 1, 1956 W. A. FIEDLER 2,743,887
SPLIT AIRCRAFT WING
Filed Nov. 12, 1952 3 Sheets-Sheet 2

INVENTOR.
WILLY A. FIEDLER
BY
ATTORNEYS

May 1, 1956 W. A. FIEDLER 2,743,887
SPLIT AIRCRAFT WING
Filed Nov. 12, 1952 3 Sheets-Sheet 3

INVENTOR.
WILLY A. FIEDLER
BY
ATTORNEYS

United States Patent Office 2,743,887
Patented May 1, 1956

2,743,887

SPLIT AIRCRAFT WING

Willy A. Fiedler, Oxnard, Calif.

Application November 12, 1952, Serial No. 320,164

3 Claims. (Cl. 244—43)

(Granted under Title 35, U. S. Code (1952), sec. 266)

The invention described herein may be manufactured and used by or for the Government of the United States of America for governmental purposes without the payment of any royalties thereon or therefor.

This invention relates to aircraft, particularly of the high speed type having swept back wings, and is essentially concerned with means for reducing the minimum safe flying speed of such aircraft, in order particularly to avoid wing tip stalling at low speeds, e. g. while landing.

The aerodynamic drag of wings at high speeds is decreased by means of sweepback. However, this advantage in aircraft having swept back wings is offset by the fact that sweepback increases the danger of wing tip stalling at low speeds, requiring landing of such craft at comparatively high and dangerous speeds. This problem is particularly acute with respect to landing such aircraft on aircraft carriers having necessarily limited landing space.

As pointed out in U. S. Pat. No. 2,111,274, the desirability of providing, in conventional aircraft, a wing structure which at the same time has a low drag coefficient while the plane is in flight and has a high lift coefficient during takeoff and landing, has long been recognized. Various wing structures have accordingly been proposed in an effort to achieve this goal, mainly in the form of structures providing variable wing area. However, the prior art structures are complicated and have not solved the major problem of wing tip stalling, particularly in connection with aircraft having swept back wings.

One object of this invention is to reduce the safe minimum speed, particularly the landing speed, of aircraft especially of the high speed type.

Another object of the invention is to decrease or eliminate wing tip stalling at low speeds in aircraft having swept back wings.

Another object is to provide a structure for effectively reducing wing sweepback in such aircraft and to increase lift during takeoff and landing, and while cruising at low speeds, e. g. during climb and glide phases.

Another object is the provision in high speed aircraft, particularly aircraft having swept back wings, of wing structure which affords increased lift at low speeds and diminished drag particularly at high speeds, or wherein the ratio of the maximum lift coefficient (e. g. during landing) to the minimum drag coefficient (at high speeds) is increased.

A particular aim of the invention is to provide a simple, rugged, easily operated auxiliary wing structure in combination with the main wing chiefly of aircraft utilizing the sweepback principle, to achieve the foregoing desired results.

Figure 2:
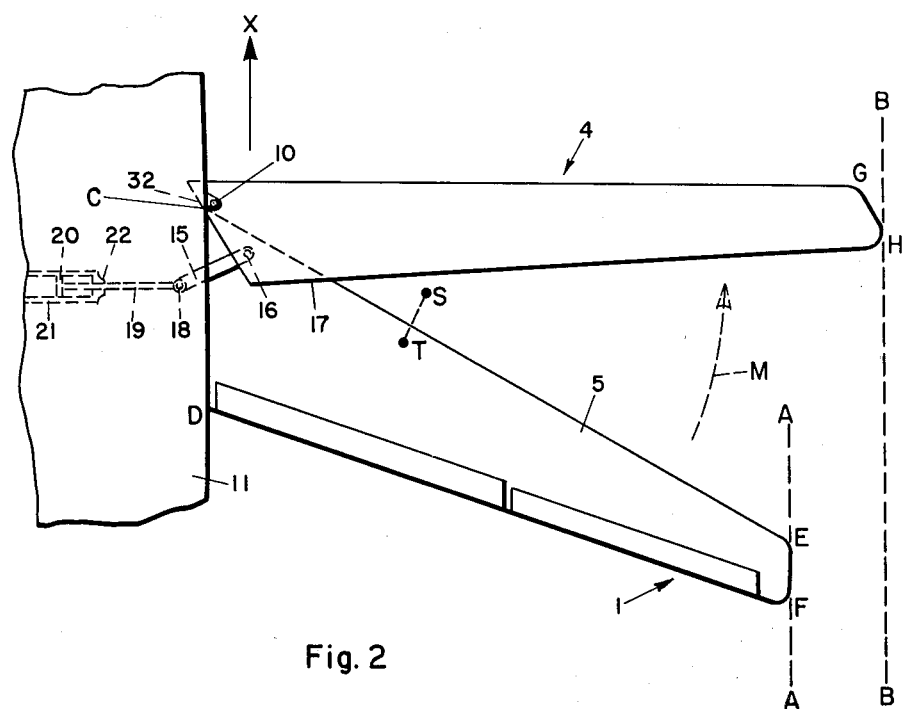
Figure 3:
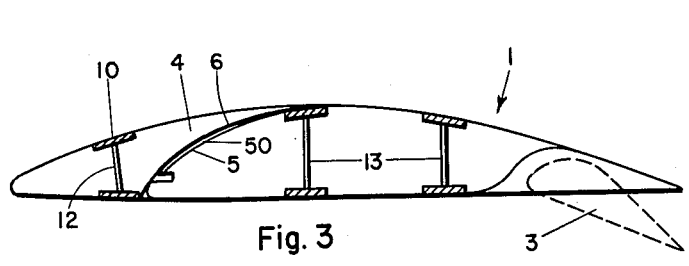
Figure 4A:
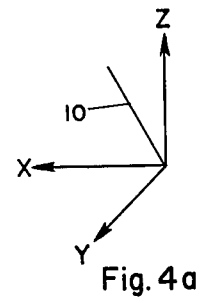
Figure 4:
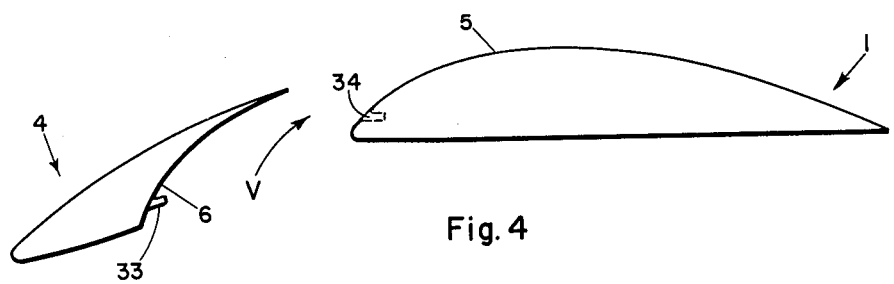
Figure 5:
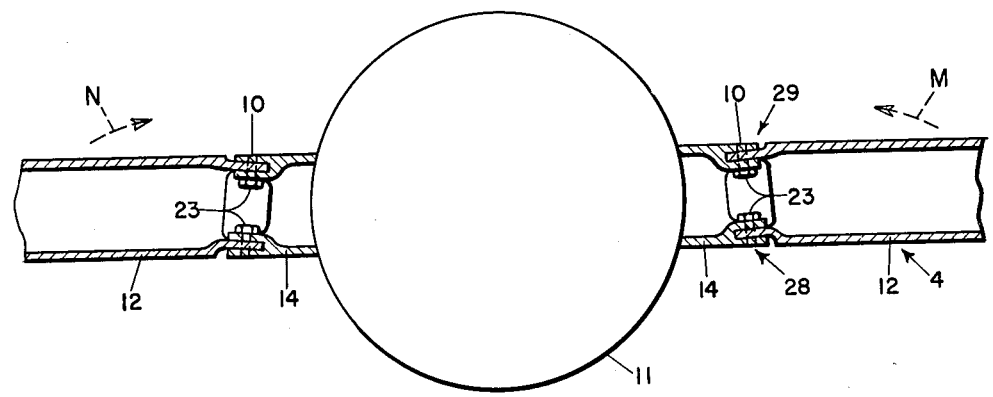
Figure 6:
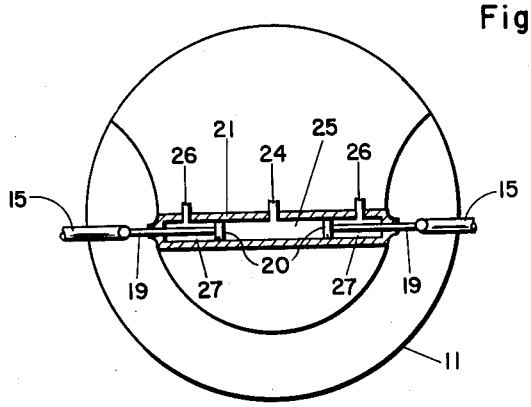
Figure 7:
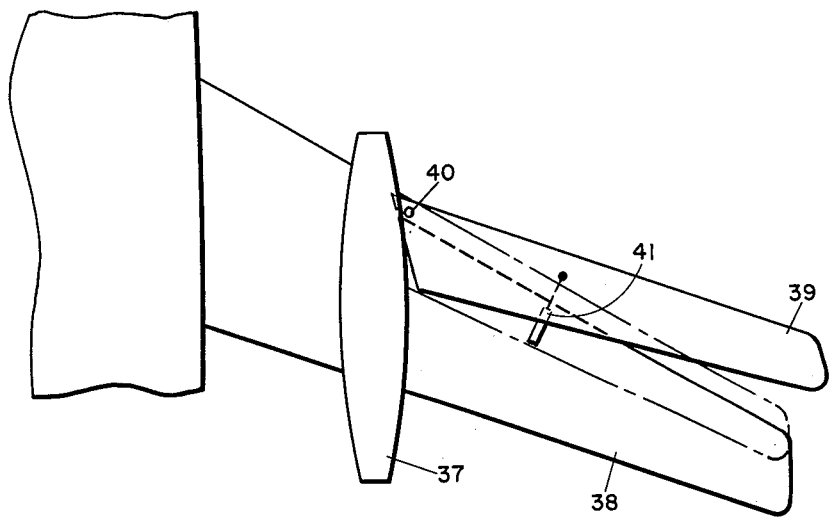
Figure 8:
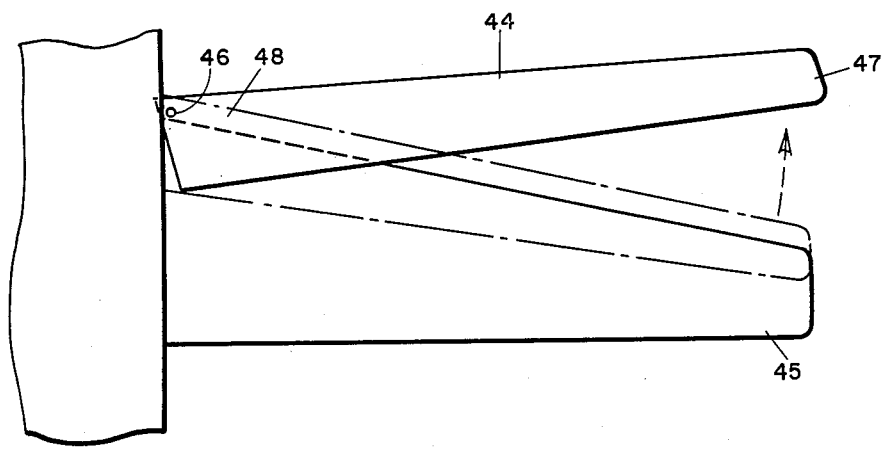

Other objects and many of the attendant advantages of this invention will be readily appreciated as the same becomes better understood by reference to the following detailed description when considered in connection with the accompanying drawings wherein:

Fig. 1 is a plan view of wing structure in accordance with the invention,

Fig. 2 is a plan view of the structure of Fig. 1 with the auxiliary forewing thereof in operative position, Fig. 3 is a schematic cross section of the wing structure shown in Fig. 1, Fig. 4 is another schematic cross section of the wing structure of the invention as shown in Fig. 2, Fig. 4a is a diagram showing directional coordinates in relation to the structure of Figs. 3 and 4, Fig. 5 is a view showing certain details of the invention structure, Fig. 6 is a view showing certain other details of the invention structure, Fig. 7 is a plan view of another embodiment of the wing structure of the invention, and Fig. 8 represents still another embodiment of invention.

The objects of the invention are achieved by combining with each of the wings of an aircraft, especially high speed aircraft utilizing the sweep-back principle, an auxiliary forewing properly positioned and arranged, as hereinafter described, with respect to its corresponding main wing. This forewing fits snugly against the upper forward surface of each of the main wings, effectively forming a unitary wing structure, and is arranged to pivot forward away from the main wing, with greatest relative movement at its outer portion, during periods of reduced speed, e. g. while landing, to enhance the lift of the craft. Such pivotal movement takes place about a fixed axis located adjacent the leading edge of the main wing and substantially spaced from the outer portion thereof. Means are generally provided for controlling pivotal movement of the forewing about this axis.

Preferably, the pivotal axis is positioned at an oblique angle somewhat inclined from a perpendicular to the plane of flight to enable the forewing to be pivoted in an arc forward and downward away from the surface of the main or swept back wing and into the optimum position for high lift. Further, in the preferred embodiments of the invention, the tips of the forewing extend substantially to the main or swept back wing tips so that when the forewing is pivoted forward to its operative position, the effective span of the swept back wing is increased.

The use of a forewing, as described above, particularly in combination with a swept back wing in high speed aircraft of this type, has several functions and advantages. These include reduction of sweepback at low speeds, provision of high lift, and reduction or complete elimination of the tendency of such craft toward wing tip stalling not only during landing and takeoff, but also while cruising at low speeds. Further, formation of a slot between the forewing and its corresponding swept back wing also improves the stalling and landing characteristics of the craft. The decreased wing taper ratio of the overall wing surface effected by the invention structure further aids in this respect. Movement of the forewing to its operative position, bringing about an increase in the effective span of a swept back wing results in reduction of induced drag, improving the gliding angle of such craft. Moreover, pivotal movement of the forewing to its extended operative position shifts the overall center of pressure of the wing area forward, resulting in automatic "trimming" for landing, and produces considerable increase in wing area, causing considerable reduction of "wing loading" and therefore landing speed. All of the foregoing advantages are accomplished by provision of a simple auxiliary wing structure in accordance with the invention principles.

In a preferred embodiment of the invention illustrated in Figs. 1 and 2, wing 1 of a high speed aircraft of sweepback design having a pair of such wings is shown. Wing 1 has the conventional aileron 2 on the outer portion of its trailing edge 9 and the conventional flap (or flaps) 3 adjacent the aileron on the inner portion of its trailing edge. An auxiliary forewing 4, in accordance with the invention, fits snugly against the upper forward surface 5 of the swept back wing, the rear surface 6 of the forewing having substantially the same contour as such upper forward surface. The tips 7 of the forewing extend substantially to the tips 8 of the swept back wing, and in the preferred embodiment shown in Figs. 1 and 2, the auxiliary forewing 4 has the same span as the swept back wing. It is apparent that when the forewing is in snug engagement with the main wing, it effectively forms a single wing.

The forewing 4 is arranged to pivot forward about a fixed axis 10 located close to the leading edge 5a of the swept back wing and closely adjacent the fuselage 11 of the craft. Referring to Fig. 3, the pivotal axis 10 is positioned along spar 12 of the forewing, the swept back wing containing one or several similar spars 13. As noted in Fig. 5, the hinge or pivotal axis 10 may be formed by the connection between spar 12 and the inner spar 14 of the forewing attached to the fuselage or engine nacelle, the cross section of these spars, as seen in Fig. 3, being somewhat inclined from a perpendicular to the plane of flight. Spars 12 and 14 are pivotally connected at their ends by means of pins or bolts 23 fastening the respective lower and upper tongue and groove connections 28 and 29 of these spars. The bolts are lined up so that the axis 10 on which each of the forewings is hinged not only slopes forward in the X—Z plane (see Figs. 3 and 4a), but also laterally in the Y—Z plane as seen in Fig. 5. This gives the axis a resultant slope such that for example when the right forewing in Fig. 5 is pivoted forward in a counterclockwise direction shown by the dotted arrows M in Figs. 2 and 5, the forewing moves in an arc forward and simultaneously downward away from the surface of the swept back wing to its operative position as shown in Figs. 2 and 4 substantially perpendicular to the line of flight, forming a split wing type of structure. When the left forewing as seen in Fig. 5 is pivoted forward in a clockwise direction shown by the dotted arrow N, this forewing also moves in an arc forward and simultaneously downward to its extended operative position opposite the right forewing.

Pivotal movement of each forewing to its optimum extended position when the craft is operating at low speeds, e. g. while landing, reduces the sweepback and effectively increases the span of the swept back wings by twice the distance from A—A to B—B in Fig. 2. Such movement also provides a well formed slot V between each forewing and swept back wing as seen in Fig. 4, and increases the overall wing area. Moreover, as noted in Fig. 2, the wing taper ratio is reduced from $$\frac{CD}{EF}$$

to $$\frac{CD}{EF+GH}$$

when the forewing is in forwardly extended position. Thus, movement of the forewings to their operative position in the above manner provides considerably increased lift, practically eliminating the danger of wing tip stalling. Further, a forward shift of the overall center of pressure from a point T to a point S in Fig. 2 provides automatic trimming and increased maneuverability for landing.

To control pivotal movement of the forewing with respect to the main or swept back wing, a rod 15 is pivoted at one end 16 on the forewing adjacent its trailing edge and in its innermost portion near the fuselage, and at the other end 18 to arm 19 of a reciprocating piston 20 slideably movable within cylinder 21, arm 19 being supported for reciprocal movement by means of bearing 22. As seen in Fig. 6, the cylinder 21 contains two oppositely positioned pistons 20 and their associated linkages described above, for simultaneous pivotal movement of the opposite forewings of an aircraft according to the principles of the invention. To cause both forewings to be pivoted outwardly to their extended position, e. g. to B—B in Fig. 2, hydraulic fluid is introduced through an opening 24 into space 25 in the center of cylinder 21 between the opposed pistons 20, resulting in outward movement thereof and of the respective attached arms 19 and rods 15. To bring about pivotal movement of the forewings back to normal engagement in contact with the respective main wings, the fluid is withdrawn from space 24 and hydraulic fluid introduced through openings 26 near opposed ends of cylinder 21, into spaces 27 between the ends of the cylinder and the pistons 20.

In order to accommodate the upper inner edges 32 of each of the forewings adjacent the fuselage during pivotal movement of the forewing to its operative position seen in Fig. 2, slots (not shown) are provided in the fuselage into which edge 32 of each forewing is conducted on movement of the forewing into its operative position. A number of protruding members or lugs 33 are provided on the forewing, extending outwardly from its rear surface 6 and positioned along the length thereof. When the forewing is brought into contact with a corresponding main wing, each of these protruding members fits tightly into a cavity 34 in the main wing, such cavities having substantially the same contour as members 33 and also being spaced along the length of main wing 1. Thus, the forewing is maintained in tight frictional or locked engagement with the corresponding main wing in normal flight.

In Fig. 7 is shown another modification of the wing structure of the invention. In this modification, a jet engine 37 is mounted on a swept back wing 38 and the forewing 39 is arranged to be pivoted at point 40 adjacent the jet engine. Hence, while the forewing 39 does not have the same span as the main wing 38, on pivotal movement of the forewing 39 forward to a position perpendicular to the line of flight, this structure also results in increased lift and efficiency of the main wing 38, and in substantially all the advantages noted above. In this modification pivotal movement of the forewing is effected by means of a hydraulic jack 41 connected to main wing 38 and forewing 39, and having suitable linkages (not shown) for control by the pilot. Since by this particular arrangement the right and left forewings are readily movable independently of each other, if desired, such forewings may also serve as ailerons.

While the invention is particularly applicable and of greatest importance in connection with aircraft of the sweepback type, it may also be utilized to advantage in aircraft having conventional wing design, and particularly high speed aircraft of this type. As seen in Fig. 8, when forewing 44 in accordance with the invention principles is employed in combination with a main wing 45 of conventional design, and is pivoted counterclockwise about axis 46, it is conducted forward to an optimum position with its tip 47 farther forward than its innermost portion 48. While it is apparent that movement of forewing 44 to this position does not increase the span of the main wing 45, as in the case of the swept back wing combination shown in Fig. 2, employment of forewing 44 in the embodiment of Fig. 8 also results in increased lift of the craft and the other advantages heretofore noted.

It is apparent that structural modifications of the above described embodiments may be made without departing from the spirit and scope of the invention. For example, the hydraulically operated means for bringing about pivotal movement of the forewing may be replaced by completely mechanical means using gear systems and associated linkages. In certain cases pivotal movement of the forewing may be accomplished in the absence of external structural means for controlling it. Thus, where the pivotal axis has a certain slope, movement of the forewing forward to its operative position may take place simply when the speed of the craft has been reduced to a predetermined value and movement of the forewing back to its normal position in contact with the main wing affected simply by increasing the speed of the craft to an amount above this predetermined value, without the necessity of any hydraulic or mechanical means for controlling such movement. Further, the forewing may be pivoted alternatively on an axis directly connected to the fuselage or engine nacelle or on an axis directly connected to the main or swept back wing. Moreover, the location of the pivot or hinge axis may be shifted outwardly farther along the forewing than shown in the modifications of Figs. 1, 7 and 8.

From the foregoing, it is apparent the invention affords a simple, rugged, easily controlled auxiliary wing structure in combination with the main wings of an aircraft, particularly of the high speed sweepback type, resulting in many advantages, including operation of such aircraft with safety and at high efficiency. The most important advantage of the invention structure is the increase in lift and the effective reduction of sweepback afforded at low speeds, resulting in materially reducing the landing speed and the danger of wing tip stalling under these conditions. Moreover, this advantage is achieved without substantially increasing the drag. This especially enables aircraft of the sweepback type having high wing loading to be more readily and effectively operated from aircraft carriers.

This device is furthermore useful for large long range guided missiles during the initial acceleration phase and climb. The reduction of the minimum takeoff speed reduces the energy required for, and increases the safety of, landing such missiles.

It has been indicated above that the rear surface of the forewing of the invention fits snugly against the upper forward surface of its associated main wing and that such rear surface has substantially the same contour as said upper forward surface. In practice these respective surfaces are designed so that while their outer edges are in tight contact with each other the inner portions of these surfaces are a slight distance apart and not actually touching, as indicated by numeral 50 in Fig. 3. Hence, the terms "snug" and "snugly" employed in the specification and claims, as applied to the nature of fit between the forewing and main wing of the invention when the two are brought together, are intended to include the immediately foregoing type of structure.

Obviously many modifications and variations of the present invention are possible in the light of the above teachings. It is therefore to be understood that within the scope of the appended claims the invention may be practiced otherwise than as specifically described.

I claim:

1. An aircraft structure designed to reduce safe minimum speed in high speed aircraft which comprises a fuselage, swept back wings extending laterally from both sides of said fuselage, each of said wings having in combination therewith an auxiliary forewing fitting snugly against the upper forward surface thereof, each of said forewings being pivotally mounted on a fixed axis located closely adjacent the leading edge of said swept back wings and in the innermost portion of said forewings, said axes sloping forwardly of a plane defined by the Y and Z principle axes of the aircraft and upwardly and laterally inward toward the plane defined by the X and Z principle axes whereby said forewings are pivotally movable in an arc forward and downward away from the surface of said swept back wings with greatest relative movement at the outer portion of said forewings, and means for controlling pivotal movement of said forewings about said pivotal axes.

2. An aircraft structure as defined in claim 1 wherein said pivotal axes are located closely adjacent the fuselage and said forewings have substantially the same span as said swept back wings.

3. An aircraft structure as defined in claim 1 wherein the rear surface of each of said forewings has substantially the same contour as the upper forward surface of the swept back wing with which it is in contact, and including means for maintaining each of said forewings in tight engagement with its corresponding swept back wing in normal flight.

References Cited in the file of this patent

UNITED STATES PATENTS

| 1,606,117 | Caples | Nov. 9, 1926 |
| 2,683,574 | Peterson | July 13, 1954 |

FOREIGN PATENTS

| 210,181 | Great Britain | Jan. 31, 1924 |
| 493,655 | Great Britain | Oct. 12, 1938 |